United States Patent [19]

Parras

[11] 4,247,934
[45] Jan. 27, 1981

[54] TESTING SYSTEM FOR DATA TRANSMISSION PATHS

[75] Inventor: Karlheinz Parras, Nuremberg, Fed. Rep. of Germany

[73] Assignee: Te Ka De Felten & Guilleaume Fernmeldeanlagen GmbH, Nuremberg, Fed. Rep. of Germany

[21] Appl. No.: 52,979

[22] Filed: Jun. 28, 1979

[30] Foreign Application Priority Data

Jul. 1, 1978 [DE] Fed. Rep. of Germany ....... 2829076

[51] Int. Cl.³ .......................... H04J 15/00; H04B 3/46
[52] U.S. Cl. .............................. 370/15; 179/175.3 R; 375/10
[58] Field of Search .......................... 370/15, 17, 24; 179/175.3 R; 178/69 R; 375/10; 371/22

[56] References Cited

U.S. PATENT DOCUMENTS

| | | | |
|---|---|---|---|
| 3,743,938 | 7/1973 | Davis | 370/15 |
| 3,920,935 | 11/1975 | Vierling et al. | 179/175.3 R |
| 3,937,882 | 2/1976 | Bingham | 370/15 |

*Primary Examiner*—Douglas W. Olms
*Attorney, Agent, or Firm*—Michael J. Striker

[57] ABSTRACT

A loopback testing system for an asynchronously operating fully duplex data transmission path comprising proximate and remote stations, a proximate-to-remote data transmission channel for transmitting data to the remote station at a relatively high maximum data transmission rate, and a remote-to-proximate data transmission channel for transmitting data to the proximate station at a relatively low maximum data transmission rate. A test-waveform generator applies to the proximate station, for transmission along the proximate-to-remote channel, a test waveform presenting a data transmission rate at least approximately equal to the aforementioned higher maximum data transmission rate. A loopback circuit at the remote station receives the thusly transmitted test waveform and reapplies it at the remote station for transmission back to the proximate station along the remote-to-proximate channel. However, the loopback circuit includes a digital frequency divider which reduces the waveform-element transmission rate presented by the test waveform to such a level that the waveform-element duration of the test waveform, as transmitted back to the proximate station, at least approximately corresponds to the aforementioned lower maximum data transmission rate.

1 Claim, 4 Drawing Figures

TESTING SYSTEM FOR DATA TRANSMISSION PATHS

BACKGROUND OF THE INVENTION

The present invention concerns the performance of loopback tests upon data transmission paths operating asynchronously in fully duplex manner, and in particular concerns such data transmission paths wherein the maximun rate of data transmission in one direction differs greatly from the maximum rate of data transmission in the other direction.

In the case of data transmission paths operating asynchronously in fully duplex manner, it is frequently necessary to utilize a loopback test circuit to perform a test-signal transmission in order to evaluate the quality of data transmission along such data transmission path. FIG. 1 schematically depicts a set-up for the performance of such a loopback test. A predetermined rectangular binary test waveform is applied to the transmitting input 1 of station 2, and transmitted in suitable form (e.g., modulated onto a carrier) from station 2 along transmission channel 3 to a remote station 4. The test waveform, as it appears at the receiver output 5 of remote station 4, is looped back to the transmitting input 6 of station 4 and transmitted via transmission channel 7 back to proximate station 2. Evaluation of the quality of the data transmission duplex path is then performed by resort to factors such as error rate, waveform distortion with respect to time, and so forth, in conventional manner; this involves comparison between the waveform reconstituted at the receiving output 8 of proximate station 2 and the test waveform originally applied to the transmitting input 1 of station 2.

The performance of such a loopback test begins to be problematic when the two data transmission channels 3 and 7 are designed for markedly different respective data transmission rates. An example of such data transmission paths are those which operate with modems, i.e., are provided with a modulator and demodulator at each of the two stations at the two ends of the duplex path, with the main data transmission channel of the transmission path designed for a maximum data transmission rate of 1200 bits/sec, but with the opposite-direction transmission channel designed for use as an auxiliary channel having a maximum data transmission rate of only 75 bits/sec.

It is conceivable to perform a loopback test upon such a duplex transmission path utilizing for the test waveform a data transmission rate corresponding to the lower of the two data transmission rates. The disadvantage of such an approach, however, is that the main transmission channel is not tested under realistic conditions corresponding to normal use. For example, such a test may not bring to light problems such as high distortion which sets in only with the onset of high data transmission rates.

Accordingly, if both the main and auxiliary channel are each to be tested using their respective maximum data transmission rates, this could be achieved by transmitting a high-rate test waveform through the main channel 3 and then, at remote station 4, evaluating the received waveform and generating at station 4 a receipt or handshaking signal which indicates the result of the main-channel test and transmitting such signal back to proximate station 2 via auxiliary channel 7. However, such a technique would necessitate the provision at remote station 4 of circuitry for generating a receiver clock signal and synchronizing it, inasmuch as this would be necessary for evaluation of the arriving test waveform. Providing asynchronously operating data transmission devices with such synchronizing circuitry merely for test purposes would, however, lead to an unacceptable cost increase.

SUMMARY OF THE INVENTION

Accordingly, it is a general object of the invention to provide a method and system for performing a loopback test upon such asynchronously operating completely duplex data transmission paths, taking into account in some practical and economically feasible manner the fact that the transmission channel for data transmission from the proximate to the remote station is designed for a maximum data transmission rate substantially higher than that for which the transmission channel from the remote to the proximate station is designed.

It is a more specific object of the invention to provide such a technique and system in a form which is very simple and inherently reliable and which is such as to permit, to the maximum extent practically possible, transmission of test waveforms through the two channels at data transmission rates corresponding to their different respective designed transmission rates.

In accordance with the present invention, a test signal or test data waveform is transmitted through the proximate-to-remote transmission channel at substantially the designed maximum data transmission rate for that channel. The test waveform produced at the receiver output of the remote station is, in the preferred embodiment, applied to the input of a binary counter or frequency divider, and the output of the latter is used to apply the return signal to the transmitting input of the remote station, i.e., for transmission back along the remote-to-proximate channel of the duplex data transmission path. The binary frequency divider's output signal, which is transmitted back to the proximate station, has a signal- or waveform-element duration which at least approximately corresponds to the designed maximum transmission rate of the remote-to-proximate transmission channel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
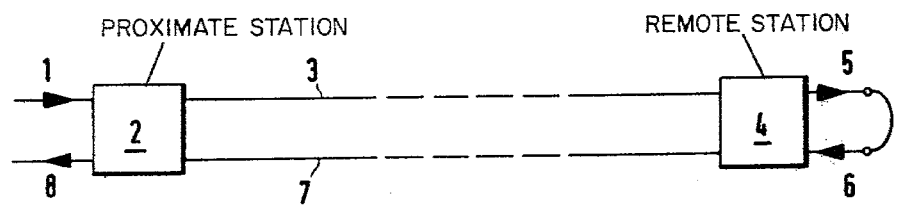
FIG. 1 schematically depicts the set-up for a conventional loopback test performed upon a duplex data transmission path.
Figure 2:
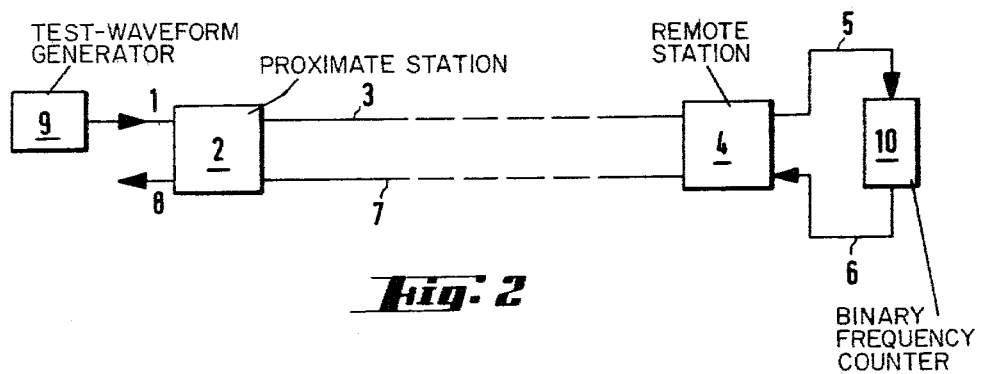
FIG. 2 schematically depicts the set-up for an inventive loopback test pefformed upon a duplex data transmission path whose two channels are designed for markedly different maximum data transmission rates.

With reference to the duplex data transmission path schematically depicted in FIG. 2, it is assumed, for the sake of concreteness, that the transmission channel 3 from the proximate station 2 to the remote station 4 is designed for a maximum data transmission rate of 1200 bits/sec, and that the transmission channel 7 (auxiliary channel) from the remote station 4 to the proximate station 2 is designed for a maximum data transmission rate of 75 bits/sec.

A test-signal or test-waveform generator 9 supplies a rectangular test waveform to the transmitting input 1 of the proximate station 2. The proximate-to-remote (main) transmission channel 3 transmits in reliance upon a modem, and the proximate station 2 is provided with a modulator for modulating the test waveform applied to input 1 onto a suitable carrier, the remote station 4 being provided with a corresponding demodulator. The test waveform is transmitted via proximate-to-remote transmission channel 3, this channel having a bandwidth extending from 1.1 to 2.3 kHz, to the remote station 4. At station 4 the transmitted signal is demodulated and the rectangular test waveform is recovered at receiver output 5 and applied to the input of a binary frequency divider or counter 10. In the exemplary embodiment illustrated, frequency divider 10 is a 3-bit or 3-stage binary counter used as a frequency divider having a frequency-division factor of eight. The output signal of binary frequency divider 10 is applied to the transmitting input 6 of remote station 4 and is transmitted back to proximate station 2 via transmission channel 7, the latter having a frequency range of 420 Hz±37.5 Hz. The frequency-divided rectangular test waveform is reproduced at receiver output 8 of proximate station 2.

The frequency-division factor q of frequency divider 10 is advantageously established at one half the ratio of the main-channel maximum data transmission rate to the auxiliary-channel maximum data transmission rate. In the case of the example here discussed, this yields:

$$q = 0.5 \cdot \frac{1200 \text{ bits/sec}}{75 \text{ bits/sec}} = 8.$$

The factor 0.5 in this relationship results from the fact that binary frequency divider 10 responds to only every second one of the flanks of the rectangular waveform applied to its input, i.e., if one counts both the positive- and negative-going flanks.

In the event that the two data transmission channels did not have a whole number ratio as between their respective data transmission rates, i.e., with q accordingly not an integer, q would be rounded off to the next lower or higher integer, such as to best approximate to the data transmission rate of at least one of the two channels.

For the sake of a concrete example, the test waveform supplied by test-waveform generator 9 in the exemplary embodiment disclosed herein is so structured as to produce, at the output of binary frequency divider 10, a standard CCITT pseudorandom text having a period of 511 bits. The use of a test waveform of that character has the advantage that the signal ultimately transmitted back to receiver output 8 of proximate station 2 can be monitored using conventional monitoring devices designed for such a CCITT text.

Figure 3:
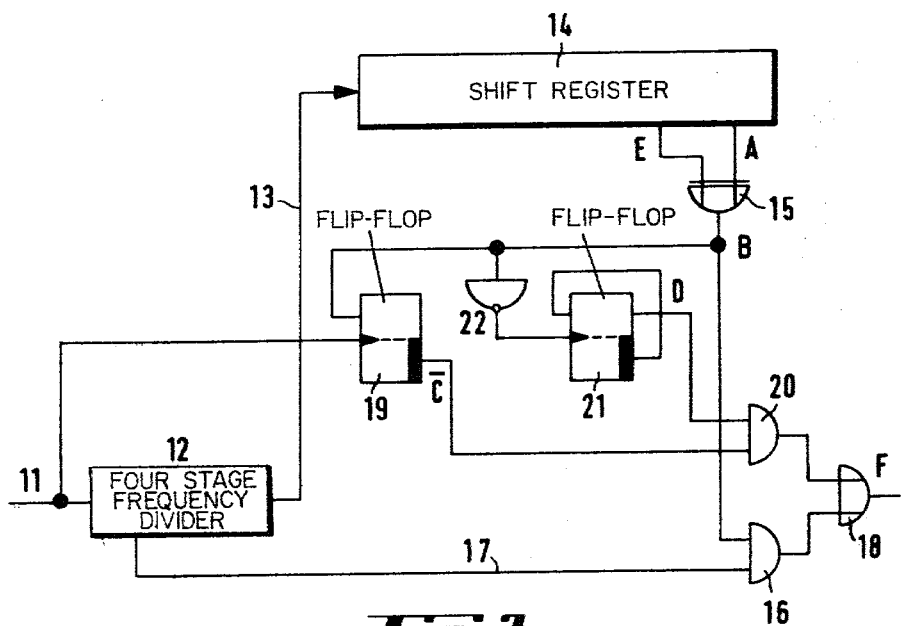
FIG. 3 depicts exemplary embodiment of a circuit used in generation of the test signal or test waveform used for the inventive loopback test.

FIG. 3 depicts a circuit for generating such a test waveform. The input 11 of test-waveform generator 9 is connected to the input of a 4-stage frequency divider 12 and is driven by a 1200 Hz clock frequency; frequency divider 12 may be a simple 4-bit binary counter. At its output stage, frequency divider 12 furnishes, via line 13, a clocking frequency of 75 Hz to the shift-signal input of a closed or circulating shift register 14. Shifter register 14 has nine stages and produces at the data output of its last stage a signal corresponding to the aforementioned CCITT text. The output A of this last shift-register stage, and also the output E of the next-to-last shift-register stage, are connected to respective ones of the two inputs of an EXCLUSIVE-OR-gate 15. A "1" signal is produced at the output of EX-OR-gate 15 when the logic signals ("0" or "1") at its two inputs, i.e., the signals at shift-register outputs A and E, are different from each other. If the signals at shift-register outputs A and E are the same (both "0" signals, or both "1" signals), EX-OR-gate 15 produces an output "0" signal. The output of EX-OR-gate 15 is connected to the upper input of an AND-gate 16. The lower input of AND-gate 16 receives, from the output of the first stage of frequency divider 12, a rectangular waveform having a 1:1 pulse: interpulse ratio and a repetition frequency of 600 Hz, i.e., corresponding to a data transmission rate of 1200 bits/sec. The output of AND-gate 16 is connected to the lower input of an OR-gate 18. The output of OR-gate 18 constitutes the output of the test-waveform generator 9, and is denoted F. If a "1" signal is present at the output of EX-OR-gate 15, then the aforementioned 600-Hz rectangular voltage waveform is transmitted via AND-gate 16 and OR-gate 18 to the output F of the test-waveform generator; i.e., for the duration of a "1" signal at the output of EX-OR-gate 15, a series of 600-Hz pulses is fed to output F of the test-waveform generator. The length of time for which a "1" signal is produced at the output of EX-OR-gate 15, and the frequency of occurrence of such an output "1" signal, are, in the concrete example here being discussed, dependent upon the CCITT text employed. However, the duration of each such output "1" signal from EX-OR-gate 15 is always equal to a 75-Hz clocking interval or an integral multiple thereof. In particular, an output "1" signal is produced by EX-OR-gate 15 in response to each change of data level ("0" to "1", or "1" to "0") in the successive bits of the pseudorandom text furnished through shift register 14.

Figure 4:
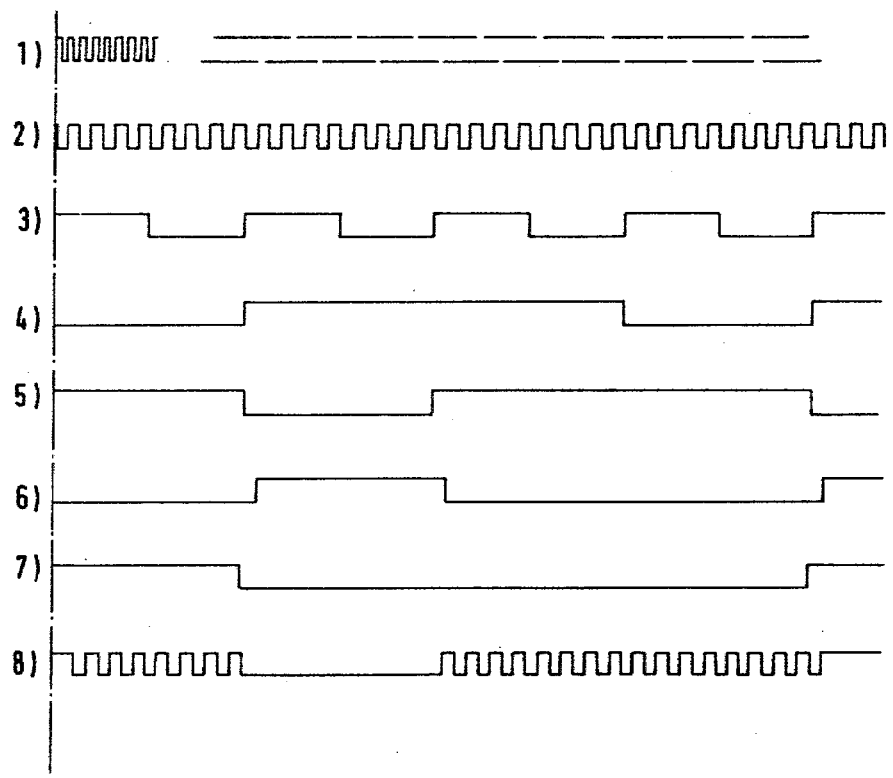
FIG. 4 is a set of waveform diagrams referred to in conjunction with explanation of the operation of the circuit depicted in FIG. 3.

These relationships will be reviewed with regard to the set of waveforms depicted in FIG. 4.

Waveform (1) in FIG. 4 depicts the 1200-Hz-repetition-frequency pulse train applied to the input of frequency divider 12, the latter reacting to each positive-going flank of the successive applied pulses.

Waveform (2) in FIG. 4 depicts the 600-Hz rectangular waveform produced at the output of the first stage of frequency divider 12 and transmitted via line 17 to the lower input of AND-gate 16.

Waveform (3) depicts the 75-Hz clock pulse train produced at the output of the last stage of frequency divider 12 and furnished via line 13 to the shift-signal input of shift register 14.

Waveform (4) in FIG. 4 depicts a small part of the pseudorandom text produced, in serial form, at output A of the terminal stage of shift register 14.

The pseudorandom text produced, in serial form, at output E of the penultimate stage of shift register 14 is the same as depicted in waveform (4), but leads the waveform shown at (4) by one 75-Hz clock interval, i.e., leads by the amount of one period of the 75-Hz pulse train at (3).

Waveform (5) in FIG. 4 depicts the output signal, at point B, of EX-OR-gate 15. This signal is at logic level "1" when the logic level of the signal at A, waveform (4), during any given 75-Hz clock interval is different from the logic level which the signal at A will have during the next-following 75-Hz clock interval. At line (4) of FIG. 4, the logic level of the signal at A, during the five successive 75-Hz clock intervals depicted, is at "0", at "1", again at "1", at "0", and again at "1". During the first of these clock intervals waveform (4) is at level "0" but will be at level "1" during the next-following clock interval; accordingly, during this first clock interval waveform (5) is at level "1". During the second of these clock intervals waveform (4) is at level "1" and will continue to be at level "1" during the next-following (third) clock interval; accordingly, during this second clock interval waveform (5) is at level "0". And so forth.

The logic level which develops at point B (waveform (5) at the start of a 75-Hz clock interval (waveform (3)) is registered by a flip-flop 19 upon the occurrence of the next-occurring positive-going flank of the 1200-Hz clock signal (waveform (1)). The inverting or complementing output (point C) of flip-flop 19 is connected to the lower input of an AND-gate 20. The upper input of AND-gate 20 is connected to the output (point D) of a further flip-flop 21, and the output of AND-gate 20 is connected to the upper input of OR-gate 18. The clock input of flip-flop 21 is connected, via an inverter 22, to the output of EX-OR-gate 15. Waveform (6) in FIG. 4 depicts the signal produced at point $\overline{C}$. This signal is inverted with respect to that produced at point B and furthermore lags it by the amount of one 1200-Hz clock interval. The signal produced at point $\overline{C}$ serves to enable AND-gate 20 for signal transmission only during those time intervals during which AND-gate 16 is disabled by EX-OR-gate 15 and is not transmitting 600-Hz pules. During the times that AND-gate 20 is enabled by the signal at point $\overline{C}$, it transmits to the output F of the test-waveform generator the output signal at point D of flip-flop 21. As shown at waveform (7) in FIG. 4, the signal at point D changes in response to each negative-going flank of the waveform (5), i.e., of the output signal of EX-OR-gate 15.

In this way, as shown in waveform (8) of FIG. 4 which represents the actual output waveform of the test signal generator at point F, the pauses intermediate the successions of 600-Hz pulses are not always at logic level "0", but instead alternate between "0" and "1", i.e., a series of 600-Hz pulses, then a logic level "0", then another series of 600-Hz pulses, than a logic level "1", then another series of 600-Hz pulses, then a logic level "0" again, and so forth. It will be understood that the output waveform (8) of FIG. 4 is shown only in part, in correspondence to the part of the pseudorandom text waveform (4) explicitly shown. In this test waveform (8) each series of 600-Hz pulses consists of a number of negative-going flanks which is equal to eight or an integral multiple of eight. Making the pauses intermediate successive series of 600-Hz pulses alternate between logic level "0" and logic level "1" is an auxiliary expedient which serves to impart to the loopback test signal the requisite high spectral-line density throughout the whole frequency band of transmission channel 3. To even further increase the spectral-line density of the test waveform, the logic levels "0" and "1" could be assigned to these intermediate pauses in accordance with a pseudorandom scheme.

In addition to the foregoing, the performance of a loopback test in accordance with the present invention involves the following. Initially, a persistent "1" signal is transmitted from proximate station 2 via main transmission channel 3 to remote station 4, and the signal transmitted back via auxiliary channel 7 to receiving output 8 is monitored. This received back signal may be a "0" or may be a "1", depending upon what the initial state of the binary frequency divider or counter 10 happens to be at this time. The frequency divider 10 is then systematically brought into its starting state, by transmitting along channel 3 a series of "0" pulses, until such time as the signal received back at receiver output 8 finally converts from a "1" to a "0". It is to be noted that the frequency divider 10 is here presumed to respond to negative-going flanks. Accordingly, all three stages of the factor-8 frequency divider 10 are now at logic level "0". Each of the "0" pulses transmitted merely to reset frequency divider 10 has a pulse length which corresponds to the maximum data transmission rate of 1200 bits/sec for channel 7 and the spacing between the successive "0" pulses is selected to take into account the signal-travel time along the signal-transmission loop.

After frequency divider 10 has been brought to its starting state, station 2 transmits the already described test signal along data transmission channel 3. Accordingly, the start of transmission of the test waveform commences with frequency divider 10 in a predetermined, definite state. The frequency divider 10 is in this definite starting state at, for example, the start of the first succession of 600-Hz pulses in waveform (8) of FIG. 4. The number of 600-Hz pulses in each such succession is equal to eight or an integral multiple of eight. Accordingly, binary frequency divider 10 runs through its complete cycle of operation once or an integral number of times during each such succession of 600-Hz pulses, and at the start of each succession of 600-Hz pulses will each time be in this well-defined starting state.

In the concrete example here set forth for explanatory purposes, the particular manner of generating the test waveform to be used, but also more generally the frequency division introduced by binary frequency divider 10, serves to provide for transmission back to station 2 of a test waveform which corresponds to the aforementioned CCITT text, and thereby corresponds to waveform (4) of FIG. 4, but presents a data transmission rate of 75 bits/sec. It will be understood, however, that the test wavefrom need not be structured in accordance with such a standard CCITT pseudorandom text but could be structured in accordance with another scheme.

It will be understood that each of the elements described above, or two or more together, may also find a useful application in other types of circuit configurations and testing techniques, differing from the types described above.

While the invention has been illustrated and described as embodied in a loopback test involving a test waveform of particular waveform-element structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In combination with an asynchronously operating fully duplex data transmission path comprising a first and a second station, a first data transmission channel for transmitting data from the first to the second station at a respective first maximum data transmission rate, and a second data transmission channel for transmitting data from the second to the first station at a respective second maximum data transmission rate, the first maximum data transmission rate being at least several times higher than the second maximum data transmission rate, a novel testing system which comprises: means applying to the first station a test waveform for transmission to the second station along said first data transmission channel, the test waveform presenting a data transmission rate at least approximately equal to said first maximum data transmission rate; loopback means at the second station connected to receive the test waveform and applying a return waveform to the second station for transmission to the first station along said second data transmission channel, the loopback means including a binary frequency divider for reducing the waveform-element transmission rate of the test waveform to such a level that the waveform-element duration of the test waveform transmitted back along said second channel at least approximately corresponds to said second maximum data transmission rate.

* * * * *